(12) United States Patent
Hesse

(10) Patent No.: US 6,591,624 B1  
(45) Date of Patent: Jul. 15, 2003

(54) AIR CONDITIONING SYSTEM FOR AN AUTOMOBILE

(76) Inventor: Ullrich Hesse, Trolliner Str., Affalterbach (DE), D-71563

( * ) Notice: Subject to any disclaimer, the term of this patent is extended or adjusted under 35 U.S.C. 154(b) by 0 days.

(21) Appl. No.: 09/890,337
(22) PCT Filed: Jan. 12, 2000
(86) PCT No.: PCT/DE00/00082
§ 371 (c)(1), (2), (4) Date: Jan. 7, 2002
(87) PCT Pub. No.: WO00/45052
PCT Pub. Date: Aug. 3, 2000

(30) Foreign Application Priority Data

Jun. 14, 1995 (DE) .......................... 958 10 398

(51) Int. Cl.⁷ ............................... B60H 1/32
(52) U.S. Cl. ....................................... 62/244
(58) Field of Search .................. 92/162 R, 249, 92/253; 62/244

(56) References Cited

U.S. PATENT DOCUMENTS

| | | | | |
|---|---|---|---|---|
| 3,917,288 A | * | 11/1975 | Huber et al. | 277/368 |
| 4,048,975 A | * | 9/1977 | Urquhart | 123/193.6 |
| 4,704,949 A | * | 11/1987 | Foster | 92/160 |
| 4,889,039 A | * | 12/1989 | Miller | 92/162 R |
| 5,172,983 A | * | 12/1992 | Landrum | 123/48 B |
| 5,244,363 A | * | 9/1993 | Olson | 417/490 |
| 5,713,324 A | * | 2/1998 | Frame et al. | 123/193.6 |
| 5,953,980 A | * | 9/1999 | Ota et al. | 92/172 |
| 6,155,109 A | * | 12/2000 | Supak | 73/117.3 |

FOREIGN PATENT DOCUMENTS

DE 2921454 * 10/1980 .......... F04B/21/04

* cited by examiner

Primary Examiner—Henry Bennett  
Assistant Examiner—Mohammad M. Ali  
(74) Attorney, Agent, or Firm—Andrus, Sceales, Starke & Sawall, LLP

(57) ABSTRACT

In an air conditioning system for a motor vehicle with a compressor that comprises at least one cylinder with movable piston (2), to improve the sealing action between the skirt of the piston (2) and the cylinder wall (1) it is proposed to dispose on the skirt of the piston (2) a labyrinth seal and/or to dispose a ring (10) made of a flexible sealing material in a slot (8) within which a piston ring (9) is mounted.

8 Claims, 2 Drawing Sheets

AIR CONDITIONING SYSTEM FOR AN AUTOMOBILE

DESCRIPTION

Figure 1:
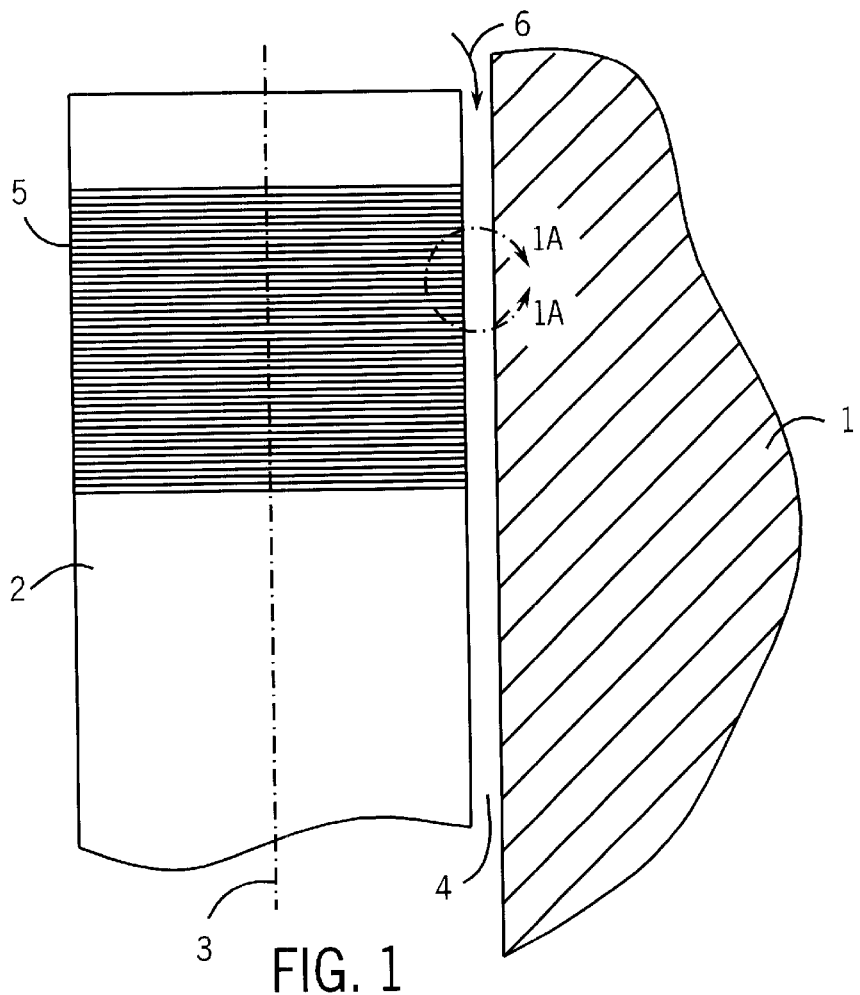
Figure 1A:
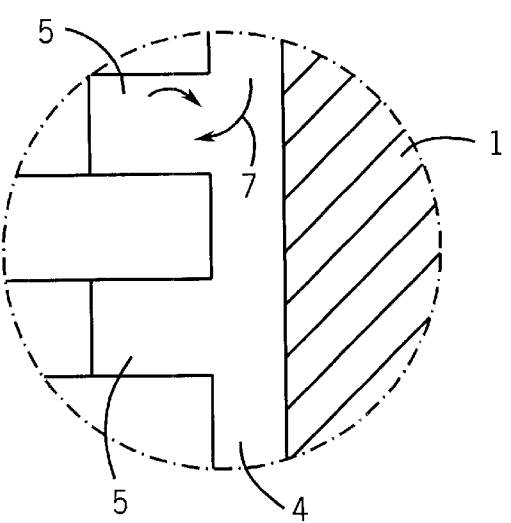

The invention relates to a vehicle air conditioning system with a compressor according to the precharacterizing clause of claim 1.

Air conditioning systems of this sort have previously been operated with coolants such as R12 or R134a. The operation of such a system requires the compressor to be capable of producing a pressure difference of ca. 10 to 20 bar between suction pressure and counterpressure. This can be achieved with compressor pistons comprising no or at most one piston ring.

Organic halogen coolants have recently been publicly criticised because when released into the atmosphere, they can have an ozone-decomposing action and aggravate the greenhouse effect. Therefore considerable efforts have been made to develop air conditioners that operate with coolants that pose no risk to ozone, i.e. are neutral with respect to the greenhouse effect. Here the problem arises that substances potentially suitable as coolants, inasmuch as they meet these requirements, demand considerably higher pressure differences. Such differences are not readily achievable with the conventional constructions of air-conditioner compressors. When an attempt is made to employ such coolants in a compressor with a conventionally constructed piston, without piston ring or with a single piston ring, the efficacy of such a compressor is seriously impaired by leakage losses owing to flow of the coolant along the skirt of the piston, and there is a risk that these will make the system entirely nonfunctional. Therefore in the case of air conditioning systems employing coolants that must be greatly compressed, cylinders have been used in which the pistons bear as many as four rings. A compressor for a vehicle that comprises one cylinder is disclosed, for example, in the U.S. Pat. No. 4,594,055. In order to improve the seal between piston and cylinder, the piston comprises on its skirt two grooves that run in the circumferential direction, with piston rings positioned in each. In comparison to a piston with only one piston ring, this piston is more difficult to tilt within the cylinder, as a result of which wear and tear on the inner cylinder wall is reduced. The seal between piston and cylinder is also improved. However, this increases the effort and expense of constructing the compressor. Furthermore, the friction of the piston against the inner walls of the cylinder is considerably increased, so that operation of the compressor requires extra work that contributes nothing to the cooling action. On the contrary, the frictional heat generated between piston and cylinder is largely absorbed by the coolant, which is absolutely undesirable.

These disadvantages are not present in the air conditioning unit with the features given in Claim 1. Additional advantageous embodiments of the invention will be evident from the dependent claims.

Advantages of the Invention

By means of the invention an automobile air conditioning system is created that, by limiting leakage losses in the compressor, enables operation with coolants that must be greatly compressed, while avoiding an appreciable increase in friction as compared to air conditioners designed for smaller pressure differences.

Such an air conditioner is particularly well suited for operation with $CO_2$ as coolant in the so-called transcritical process, or with other coolants that require large differences between suction pressure and counterpressure, ranging from over 20 bar up to 100 bar.

In a first air conditioning system in accordance with the invention, the piston is provided with a labyrinth seal at its skirt surface. Such a labyrinth seal, which preferably comprises a plurality of grooves oriented in the circumferential direction of the skirt surface, is also suitable for reducing leakage losses particularly in the case of high pressures. The reason is that it is just when the pressure of the coolant contained in the cylinder is highest, a time when particularly large leakage losses are to be expected, that the viscosity of the coolant is no longer negligible because of the severe compression, and as a result the turbulence of the coolant escaping from the cylinder between its inner wall and the piston skirt, with the grooves of the labyrinth seal, presents an effective resistance to flow.

In a second embodiment of the air conditioning system in accordance with the invention, in which the piston is conventionally constructed insofar as it comprises at least one slot within which a piston ring is mounted, it is provided that there is additionally disposed in the slot a ring made of a flexible sealing material. The function of this ring is to constrict or completely block the path of the coolant, which in the case of a piston with piston ring runs through the slot substantially along its outward-facing surfaces and along the inner circumferential surface of the piston ring.

For this purpose the ring is disposed substantially between the piston ring and a side wall of the slot at which the pressure is relatively low, so that the piston ring is pressed by the coolant against the flexible ring, as a result of which a sealing action of the latter is achieved. The flexible ring itself advantageously does not extend outward beyond the surface of the piston skirt, so that it does not come into contact with the inner wall of the cylinder; therefore it is not subject to frictional wear and tear and also does not increase the force needed to overcome friction in order to drive the piston.

It is further preferred that the piston ring be held within the slot with axial play. This can enable the coolant to penetrate from the high-pressure side into a space between the inner surface of the piston ring and the bottom of the slot, and thus to press the piston ring uniformly, over its entire circumference, against the inner wall of the cylinder. It can be sufficient in this regard for this play to be generated only in a high-pressure phase of the working cycle of the compressor, by axial compression of the ring that is made of flexible sealing material.

A space can also be provided between the bottom of the slot and the inner surface of the ring made of flexible sealing material, so that the latter, just like the piston ring, is pressed radially outward by coolant that penetrates into the space and thus reinforces the corresponding extension movement of the piston ring.

Additional characteristics and advantaces will be apparent from the following description of exemplary embodiments.

FIGURES

Figure 2:
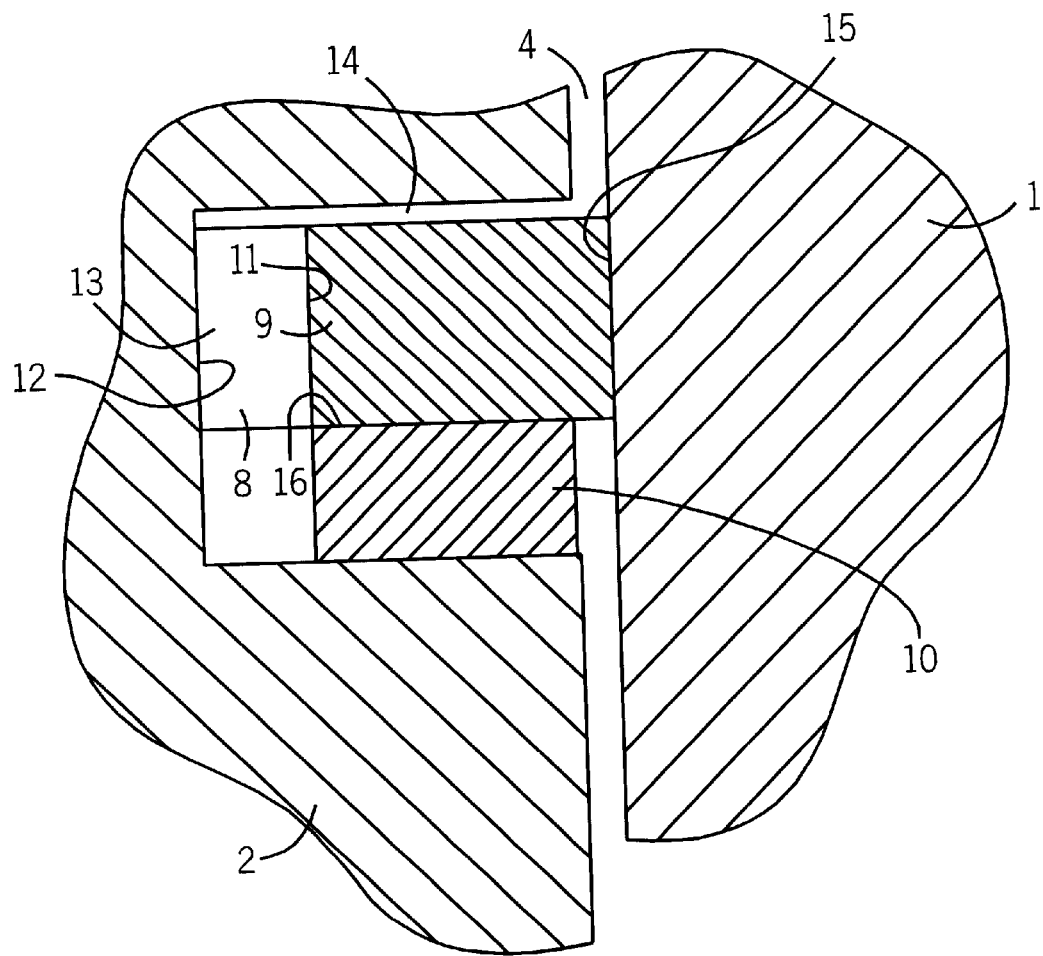

FIG. 1 shows a section of a compressor cylinder for an air conditioning system according to a first embodiment of the invention; and FIG. 2 shows a section of a cylinder according to a second embodiment of the invention.

DESCRIPTION OF THE EXEMPLARY EMBODIMENTS

The drawing in FIG. 1 shows only part of a cylinder for a compressor in an air conditioning system in accordance with the invention. The other elements of such a system are known and need not be treated here in detail.

FIG. 1 shows a section of a cylinder wall 1 and of a piston 2 that can be shifted within the cylinder along its central axis, indicated by a dot-dash line 3. The piston 2 comprises a skirt that is closely apposed to the cylinder wall 1 (the gap 4 between the two is shown larger than to scale in the figure, for the sake of clarity). On the skirt of the piston 2 is disposed a plurality of slots 5 oriented in the circumferential direction; a section of this region is shown enlarged on the right side of the figure. In this circle it can be seen that the slots 5 have a length in the direction of the axis 3 as well as a radial depth, which corresponds approximately to the width of the gap 4 between the piston and the cylinder wall 1. Coolant that escapes from the cylinder in the direction of the arrow 6, during the high-pressure phase of the cylinder, becomes turbulent at each individual slot 5 as indicated by the arrows 7, so that no uniform, laminar leakage flow can develop in the gap 4. Thus a considerable reduction of the leak current is achieved, with no narrowing of the gap 4 in comparison to conventional piston-cylinder constructions. The friction between cylinder wall and piston is therefore no higher than in conventional constructions.

To reinforce the action of the labyrinth seal, piston rings can additionally be provided at the piston.

FIG. 2 shows in section a piston-ring seal in accordance with the invention. This can be used by itself or in combination with the labyrinth seal described above.

In FIG. 2 a section of a cylinder wall 1 can be seen as well as a section of a piston 2 that can be moved along this cylinder wall. A slot 8 extends in the circumferential direction over the skirt of the piston as do the slots in FIG. 1, but has a considerably greater length and depth than do the latter. In the slot 8 are disposed a piston ring 9 as well as a ring 10 made of a flexible sealing material. The outer circumferential surface of the piston ring 9 is apposed to the cylinder wall 1; between the inner circumferential surface of the ring 9 and the bottom 12 of the slot 8 there is a space 13. The space 13 communicates with the pressure chamber of the cylinder (not shown) by way of a gap 14, which extends along the end face of the piston ring 9 on the high-pressure side, and the gap 4 between cylinder wall 1 and skirt of the piston 2.

Between the end face 16 of the ring on the low-pressure side and the side wall of the slot 8 adjacent thereto is disposed the ring 10 of sealing material. This ring 10 is advantageously fixed firmly to the end face 16. In an arrangement alternative to that shown in the figure, it can extend up to the high-pressure end face 15 of the piston ring, in the form of a multi-sided coating. The space 13 also extends between the inner circumferential surface of the ring 10 and the bottom 12 of the slot 8. The outer circumferential surface of the ring 10 is set slightly back, towards the axis, so that it is behind the skirt surface of the piston 2.

When the end face 15 is exposed to a high pressure during the high-pressure phase of the cylinder, it can move back in the axial direction, i.e. downward in the figure, with simultaneous compression of the ring 10. As a result the gap 14 becomes wider and coolant penetrates into the space 13. The pressure of the coolant on the inner circumferential surface 11 of the piston ring 9 presses the latter against the cylinder wall 1 and thus ensures an effective seal between these two surfaces. At the same time it presses the ring 10 radially outward, so that when necessary this ring expands together with the piston ring 9 and thus does not impede its outward movement. The axially compressed ring 10 simultaneously creates an effective seal between the low-pressure-sided end face 16 of the piston ring and the adjacent side wall of the slot 8.

The dimensioning of the ring 10 ensures that even under axial compression it will not come into contact with the cylinder wall 1, so that it is not exposed to frictional wear and tear.

The frictional force that must be employed to move a piston sealed in accordance with the invention does not differ substantially from that needed for a piston with conventional piston rings. Nevertheless, the considerably improved sealing action allows the piston in accordance with the invention to be used for applications with considerably elevated pressures, such as occur in particular in an air conditioning system that employs a high-pressure coolant such as, for example, $CO_2$.

What is claimed is:

1. Air conditioning system for a motor vehicle, with a compressor that comprises at least one cylinder having a movable piston (2), wherein the piston comprises in its skirt at least one slot (8) in which a piston ring (9) is mounted, characterized in that in the slot (8) a ring (10) made of a flexible sealing material is disposed.

2. Air conditioning system according to claim 1, characterized in that the ring (10) is disposed substantially between a side wall of the slot (8) on its low-pressure side and the piston ring (9).

3. Air conditioning system according to claim 1, characterized in that the ring (10) does not project beyond the skirt surface of the piston (2).

4. Air conditioning system according to claim 1, characterized in that the piston ring (9) is held in the slot (8) with axial play.

5. Air conditioning system according to claim 1, characterized in that a space (13) is provided between the bottom (12) of the slot (8) and an inner surface of the ring (10).

6. Air conditioning system according to claim 1, characterized in that carbon dioxide is provided as the coolant.

7. Air conditioning system according to claim 1, characterized in that the flexible ring (10) is attached to the piston ring (9) as a fixed coating on one or several sides.

8. Air conditioning system according to claim 1, characterized in that it generates pressure differences of over 50 bar between suction pressure and counterpressure.

* * * * *